United States Patent
Mentink

[11] Patent Number: 5,819,536
[45] Date of Patent: Oct. 13, 1998

[54] HYDRAULIC CIRCUIT

[75] Inventor: Laurentius A. G. Mentink, Haaksbergen, Netherlands

[73] Assignee: Applied Power Inc., Butler, Wis.

[21] Appl. No.: 617,814

[22] PCT Filed: Dec. 5, 1994

[86] PCT No.: PCT/NL94/00307

§ 371 Date: Mar. 20, 1996

§ 102(e) Date: Mar. 20, 1996

[87] PCT Pub. No.: WO95/15269

PCT Pub. Date: Jun. 8, 1995

[30] Foreign Application Priority Data

Dec. 3, 1993 [NL] Netherlands ............................ 9302104

[51] Int. Cl.⁶ .................................................. F16D 31/02
[52] U.S. Cl. ................................. 60/464; 60/465; 60/471; 91/523; 91/529; 91/DIG. 1
[58] Field of Search ............................. 60/464, 465, 471, 60/472; 91/523, 526, 528, 529, 531, DIG. 1

[56] References Cited

U.S. PATENT DOCUMENTS

| | | | |
|---|---|---|---|
| 3,178,886 | 4/1965 | Watson | 60/472 |
| 3,866,421 | 2/1975 | Kersten et al. | 60/464 |
| 4,433,612 | 2/1984 | Spielvogel et al. | 91/514 |
| 4,489,643 | 12/1984 | Spielvogel et al. | 91/445 |
| 4,761,953 | 8/1988 | Rosman | 60/464 |

FOREIGN PATENT DOCUMENTS

| | | |
|---|---|---|
| 0 425 156 A3 | 5/1991 | European Pat. Off. |
| 38 26 789 A1 | 2/1990 | Germany. |

OTHER PUBLICATIONS

Ing. Günter Ortmann, "Fluidics–Schaltpläne und –Schaltungen", Olhydraulik und Pneumatik, vol. 14, No. 5, May 1970, pp. 211–215.

*Primary Examiner*—F. Daniel Lopez
*Attorney, Agent, or Firm*—Quarles & Brady

[57] ABSTRACT

A hydraulic circuit for controlling a plurality of hydraulic motors of a machine has a reversible pump with its suction/pressure ports connected to the inputs of an OR-valve is connected to the input of at least one 3/2 electro-valve, which has its output connected to the inputs of the AND-valves which are not connected to the pump. The AND-valve outputs and the suction/pressure ports are used individually or in combination to control the hydraulic motors.

5 Claims, 3 Drawing Sheets

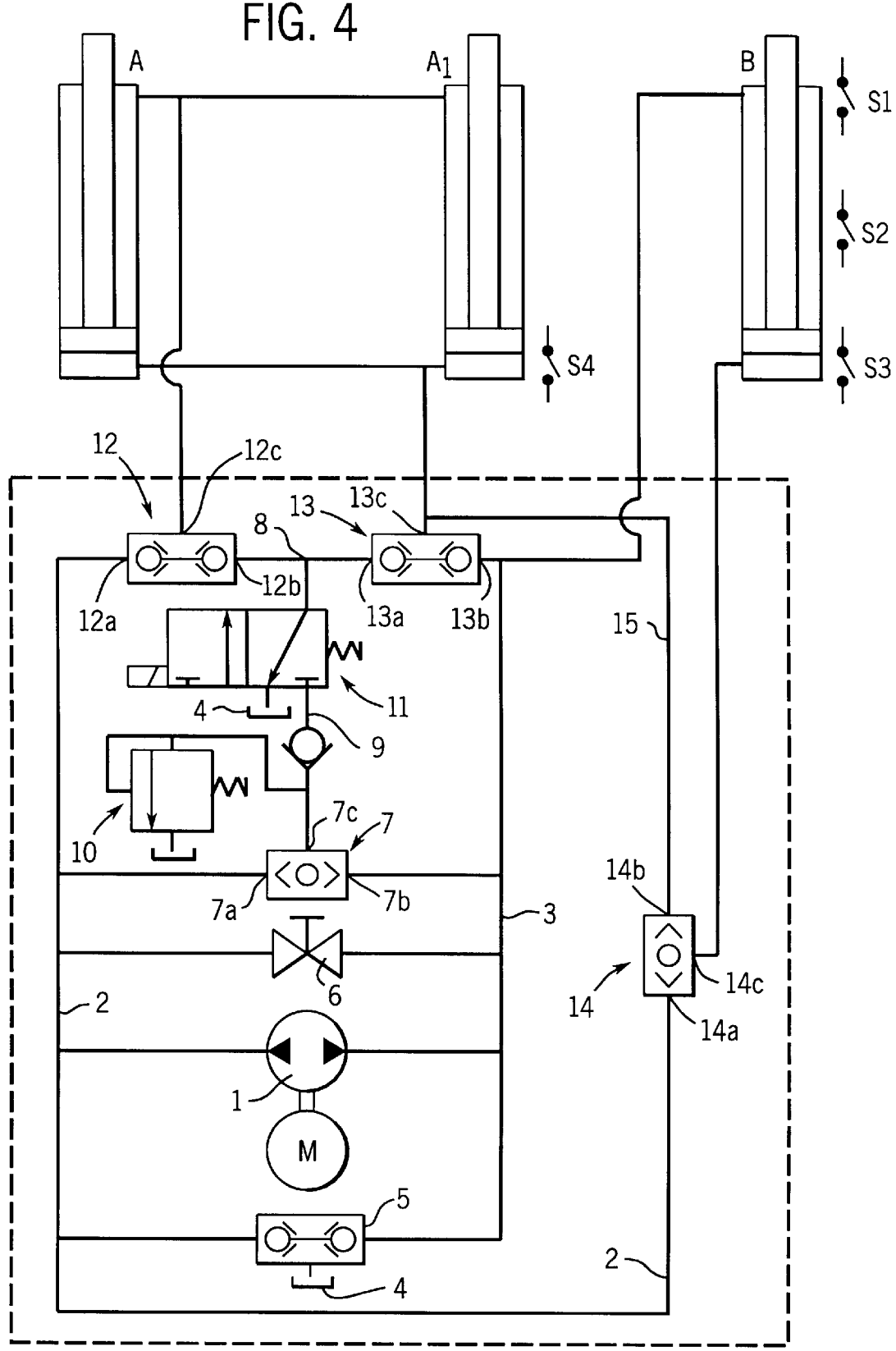

HYDRAULIC CIRCUIT

The invention relates to a hydraulic circuit for controlling a plurality of hydraulic motors, said circuit comprising a reservoir for hydraulic fluid, a reversible pump connected therewith and driven by an electric motor, as well as a valve device for controlling the hydraulic fluid flow to the various motors.

Such a hydraulic circuit is disclosed in EP-A-0 425 156.

For the control of a plurality of hydraulic motors, in particular hydraulic piston cylinder devices, it has been usual to provide each piston cylinder device with a valve device adapted to be actuated according to a desired program. With a double acting piston cylinder device such valve device usually comprises two electro-valves, which may be ball seat valves of the 3/2 type. Such valves are especially designed for high procures and leakage proof operation and are relatively expensive. In most cases, where a plurality of piston cylinder devices has to be controlled from a common hydraulic fluid source, this is not considered as a drawback, as in such cases relatively heavy piston cylinder devices are involved, which are expensive as such, whereas the pump pressures are generally not very high.

In other cases such as with the hydraulic circuit disclosed in above mentioned EP-A-0 425 156, where relatively light weight piston cylinder devices have to be actuated in a desired sequence, however, the drawback connected with the electro-valves counts very heavily. For the limited space, which is usually available for a accommodating the piston cylinder devices and the respective control unit, necessitates the use of extra high pump pressures.

As an other example of such a case reference is made to NL-A-9200628 (EP-A-0 565 190). In this case three (pairs of) piston cylinder devices are applied, which have to be actuated in a certain sequence. In such a case one speaks of a hydraulic circuit with a plurality of (three) cylinder functions. In the latter circuit the actuation is usually effected by a pump having one direction of rotation, in cooperation with a control valve block, that comprises two electro-valves for each (double acting) cylinder function.

In these cases the valves are very expensive in proportion to the relatively compact piston cylinder devices, and make a hydraulic device for opening and closing a foldable cover with a vehicle of the cabriolet-type very expensive and even more expensive in proportion to the number of cylinder functions to actuate.

More generally separate electro-valves are required for each required cylinder function. In the example of EP-A-0 425 156 where three (pairs of) double acting cylinders and consequently six control outputs are involved, there is a need for four electro-valves, whereas in the example of EPA-0 565 190 three double acting cylinders and consequently six required control outputs and six electro-valves are involved.

The invention aims at providing a hydaulic circuit, in which a relatively large number of cylinder functions with associated outputs may be obtained with a relatively small number of electro-valves.

In accordance with one aspect of the invention there is provided a hydraulic circuit for controlling a plurality of hydraulic motors, said circuit comprising a reservoir for hydraulic fluid, a reversible pump connected therewith and driven by an electric motor, as well as a valve device for controlling the hydraulic fluid flow to the various motors, characterized in that each of the suction/pressure sides of the reversible pump is connected to a respective output of a suction shuttle valve which is connected by its input to the reservoir, each of the suction/pressure sides of the reversible pump is further connected to a different one of the two inputs of an OR-valve and with one of the inputs of at least two AND-valves respectively, the out of the OR-valve being connected to the fluid inlet of at least one electro-valve, the output or outputs of which is or are hydraulically connected with the other inputs of the at least two AND-valves whereby each outlet of the at least two AND-valves and each section/pressure side of the reversible pump constitute either individual or combined control outputs towards the hydraulic motors respectively.

An OR-valve is to be considered as a valve having two inputs and an output, wherein the output will be under pressure, when at least one of the inputs is under pressure. When none of the inputs is under pressure, hydraulic fluid may, if necessary, flow back-through the output via the pressure free inputs in the upstream direction (i.e. towards the pump or the fluid reservoir respectively).

Such a valve is of a very simple construction and relatively cheap. It mainly consists of a ball element that is mounted for movement within a conduit section between two seats, the conduit section having an outlet opening at a location between the two seats.

An AND-valve is to be considered as a valve with two inputs and an output, the output being under pressure only when both of the inputs are under pressure. Such a valve is also of a simple construction and cheap. It may be considered as a conduit section having an intermediate outlet opening, said conduit section having on both sides of the outlet opening a seat for a valve element that closes towards the outlet opening, wherein a spacer element between the two valve elements prevents the two valve elements from moving onto their seats simultaneously.

When, for ale, two cylinder functions have to be controlled, e.g. one for opening and closing the foldable top and a second for locking and unlocking of the top, the use of the principle according to the present invention enables to use only one single electro-valve (of the 3/2 —type) to obtain—in cooperation with the reversible pump and two END-valves—the four control outputs required in this case.

In accordance with a further aspect of the invention there is provided a hydraulic circuit comprising at least two double acting piston cylinder devices, more particularly for opening and closing a foldable top of a vehicle of the cabriolet-type, said circuit comprising a reservoir for hydraulic liquid, a reversible hydraulic pump connected thereto and driven by an electric motor, and a valve device for controlling the hydraulic liquid flow towards the piston cylinder devices, characterized in that each of the suction/pressure sides of the reversible pump is connected to a respective output of a suction shuttle valve which is connected by its input to the reservoir, each of the suction/pressure sides of the reversible pump is further connected to a different one of the two inputs of an OR-valve and with one of the inputs of at least two AND-valves respectively, the output of the OR-valve being connected to the fluid inlet of at least one electro-valve of the 3/2 type which is common to both of the piston cylinder devices and the output or outputs of which is or are hydraulically connected with the other inputs of the at least two AND-valves, whereby each outlet of the at least two AND-valves is connected to the pull side and the push side respectively of one of said piston cylinder devices, whereas one side of the second piston cylinder device is directly connected to one of the suction/pressure sides of the pump and the other side of said piston cylinder device is connected to the output of a second OR-valve, the inputs of which are connected with the other pressure/suction side of the pump and with said outlet of the AND-valve connected to the one suction/pressure side of the pump.

The invention will be hereinafter further explained by some general examples and by a specific example with reference to the accompanying drawings.

Figure 3:
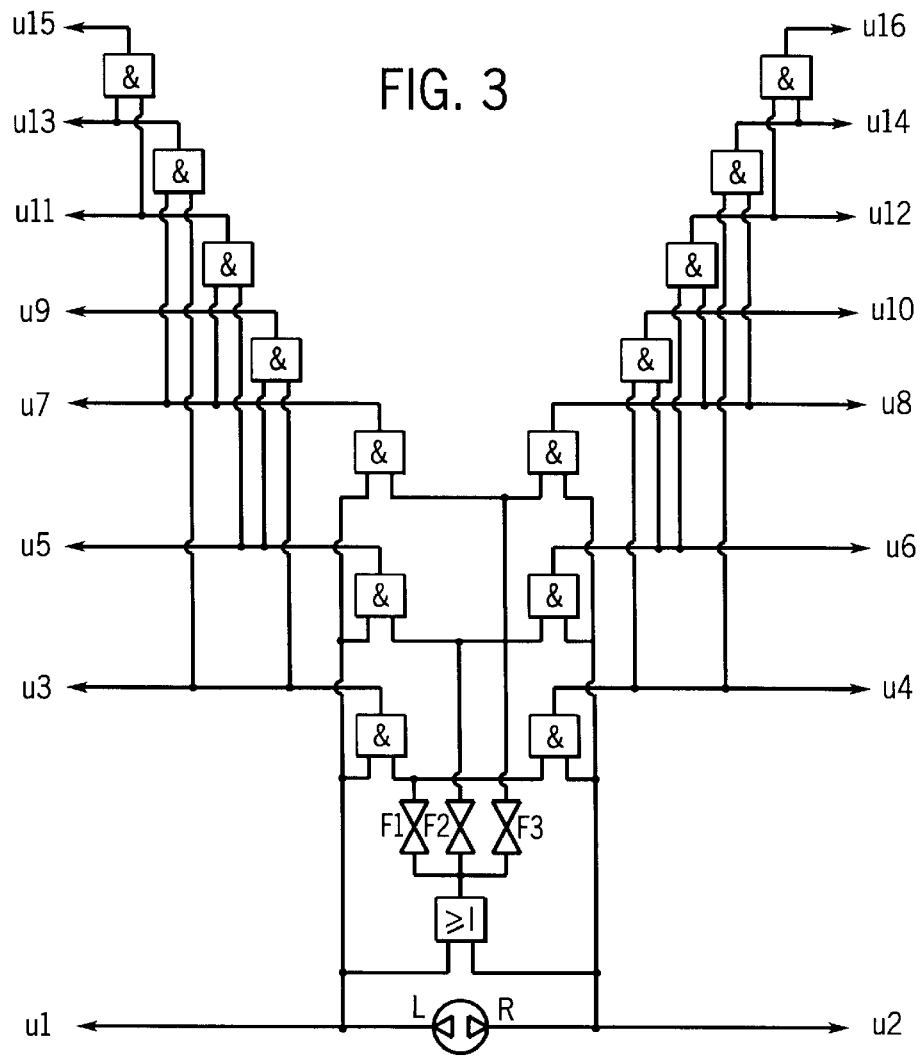
FIG. 3 shows a circuit with three electro-valves and sixteen control outputs.
Figure 5:
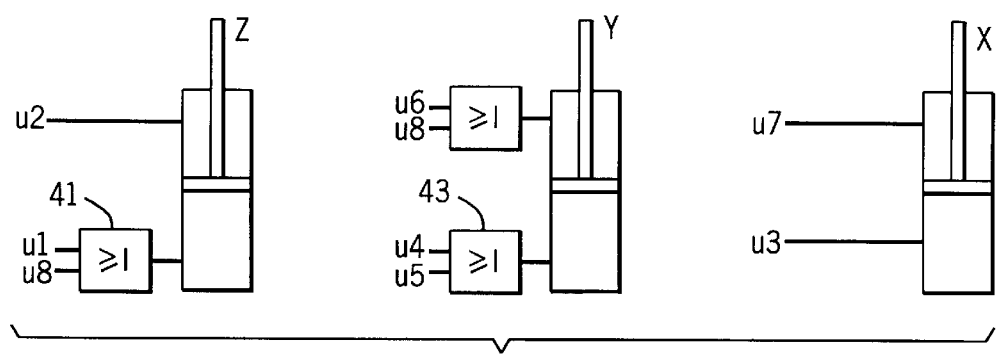

FIG. 4 shows a hydraulic diagram according to the invention, designed for controlling two different (groups of) hydraulic piston cylinder devices, by means of which the folding top of a vehicle of the cabriolet-type may be closed and locked and FIG. 5 shows in a diagrammatic manner three piston cylinder devices, by means of which on the basis of the circuit according to FIG. 3, three different cylinder functions may be realised with a device for opening and closing a foldable top of a vehicle of the cabriolet-type.

Figure 1:
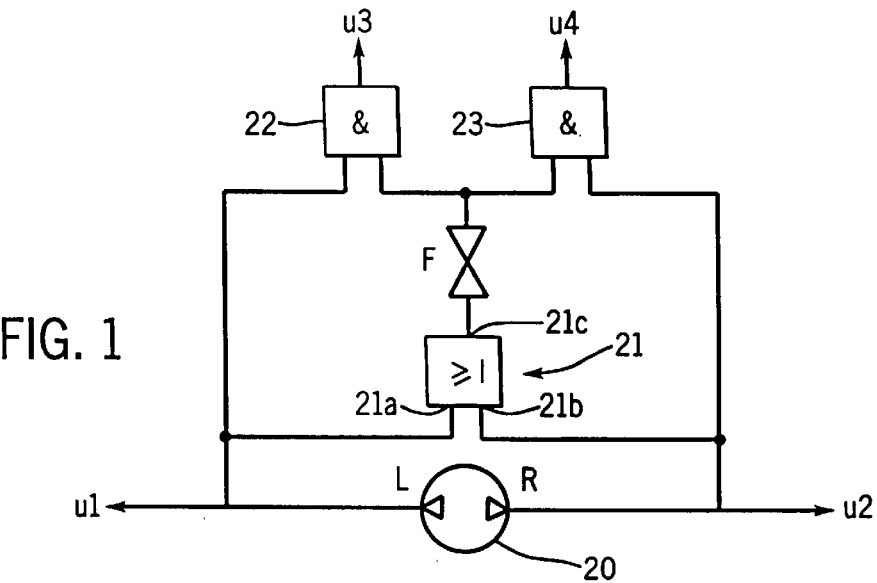
FIG. 1 shows a hydraulic circuit according to the invention in the most simple form, with an electro-valve for four control outputs.

In the circuit of FIG. 1 20 designates a pump driven by a reversible electric motor (not shown), which pump may suck hydraulic fluid from a reservoir via a suction shuttle valve (not shown). The two directions of rotation are indicated at "L" and "R" and constitute two "direct" control outputs U1 and U2 respectively. Connected in parallel to the pump 20 is an OR-valve 21, the output 21c of which is connected to the pressure connection of a valve which is diagramma-tically shown at F. In reality this is an electro-valve of the 3/2 type. The control valve F is connected to the first inputs of two AND-valves 22 and 23 respectively, the second inputs of which are each connected to a pressure/suction side of the pump 21.

The outputs of the two AND-valves 22 and 23 result in the "derived" control outputs U3 and U4 respectively.

Depending on the direction of rotation of the pump 21 and of the position of the control valve F there are four working positions:

1. pressure at output U1 if
   a) the pump rotates anti-clockwise and
   b) valve F is closed;
2. pressure at output U2 if
   a) the pump rotates clockwise and
   b) valve F is closed;
3. pressure at outputs U1 and U3 if
   a) the pump rotates anti-clockwise and
   b) valve F is opened;
4. pressure at outputs U2 and U4 if
   a) the pump rotates clockwise and
   b) valve F is opened.

Figure 2:
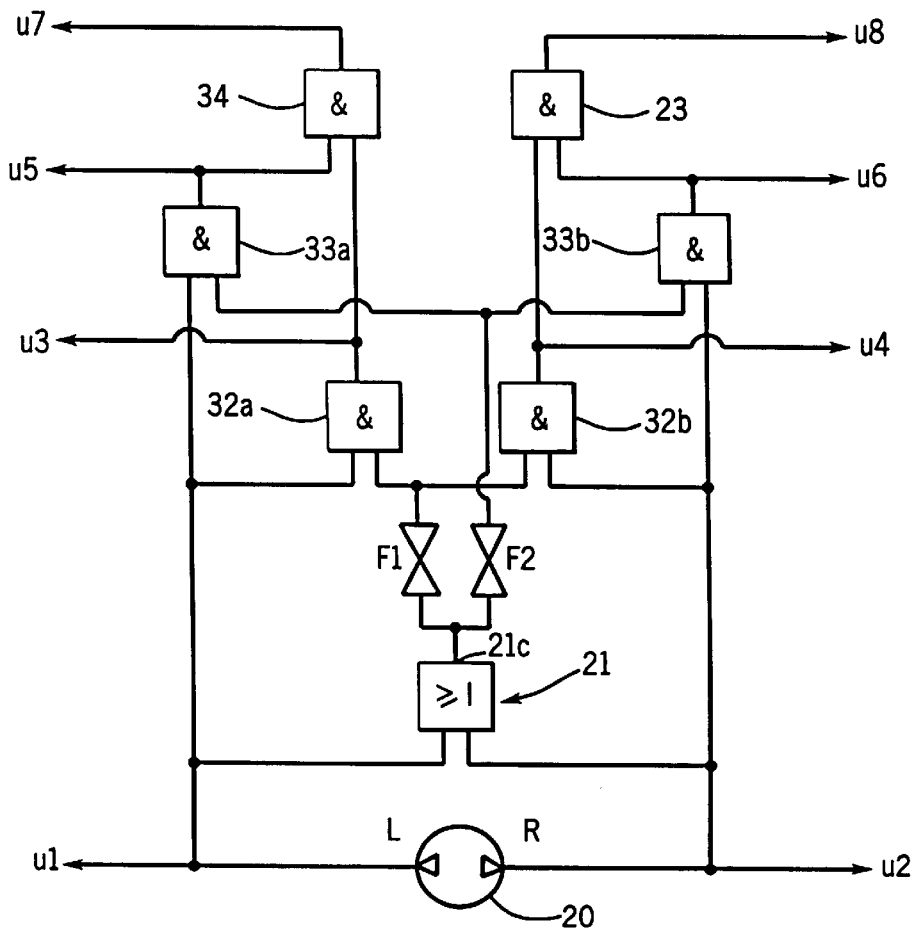
FIG. 2 shows a circuit with two electro-valves and eight control outputs.

FIG. 2 shows a circuit which is similar to that of FIG. 1, but comprises two electro-valves F1 and F2 (of the 3/2-type), which valves F1 and F2 are each connected to one input of two AND-valves 32a, 32b and 33a, 33b respectively, the outputs of which result in "derived" outputs U3–U6. The outputs of the AND-valves 32a and 33a are connected to a fifth AND-valve 34, the output of which results in a seventh control output U7, whereas the outputs of the valves 32b and 33b are also connected to the inputs of an eighth AND-valve 35, the output of which results in an eighth control output U8.

In this case the eight working positions are:

1. pressure at output U1 if
   a) the pump rotates anti-clockwise and
   b) both of the valves F1 and F2 are closed;
2. pressure at output U2 if
   a) the pump rotates clockwise and
   b) both of the valves F1 and F2 are closed;
3. pressure at outputs U1 and U3 if
   a) the pump rotates anti-clockwise,
   b) valve F1 is open and
   c) valve F2 is closed;
4. pressure at outputs U2 and U4 if
   a) the pump rotates clockwise,
   b) valve F1 is open and
   c) valve F2 is closed;
5. pressure at outputs U1 and U5 if
   a) the pump rotates anti-clockwise,
   b) valve F2 is open and
   c) valve F1 is closed;
6. pressure at outputs U2 and U6 if
   a) the pump rotates clockwise,
   b) valve F2 is open and
   c) valve F1 is closed;
7. pressure at outputs U1, U3, U5 and U7 if
   a) the pump rotates anti-clockwise and
   b) both of the valves F1 and F2 are open and
8. pressure at outputs U2, U4, U6 and U8 if
   a) the pump rotates clockwise and
   b) both of the valves F1 and F2 are open.

FIG. 3 shows an example of an hydraulic circuit, in which the number of possible control outputs has been doubled as compared with that in the circuit of FIG. 2.

After the above description of the circuits of FIG. 1 and 2 it will not be necessary to explain the sixteen working positions in the circuit of FIG. 3.

With reference to FIG. 4 a specific use of the circuit according to the invention for opening, closing, locking and unlocking of the folding top of a vehicle of the cabriolet-type will now be described.

In the diagram of FIG. 4 A and A1 designate the two piston cylinder devices, which together—each provided on a side of a vehicle—may close and open the folding top (not shown).

B designates a piston cylinder device, which controls a lock (neither shown) that is mounted at the forward fixed top edge and may lock the top in the closed position.

In the diagram 1 designates an hydraulic pump which is driven by a reversible motor M, the suction/pressure sides of which pump are connected to conduits 2 and 3, which are alternatlingly functioning-depending on the direction of rotation of the motor M—as suction and pressure conduits respectively and are both connected to a reservoir 4 for hydraulic fluid. Connected in parallel to the pump 1 are a suction shuttle valve 5, a normally closed manually operable auxiliary valve 6 for emergency cases and an OR-valve 7 with changing inputs 7a, 7b and pressure output 7c. The conduits 2 and 3 unite at point 8. An overload valve 10 and an 3/2 electro-valve 11 of the ball seat type are provided in a connecting conduit 9 between the point 8 and the pressure output 7c of the OR-valve 7.

In each of the conduits 2 and 3—on both sides of the point 8—there is provided an AND-valve 12 and 13 respectively, having inputs 12a, 12b and 13a, 13b respectively and an output 12c and 13c respectively.

The output 12c of the AND-valve 12 is connected with the pull side of the two cylinders A, A1, whereas the output 13c of the AND-valve 13 is connected with the push side of the cylinders A, A1.

The pull side of the cylinder B is directly connected to the conduit 3, whereas the push side of this cylinder is connected to the output 14c of valve 14, of which one input 14b is connected to the conduit 2 and the second input 14b is connected with the pull side of the cylinder A, A1.

The operation of the circuit will now be described, starting from the situation, in which the top is open. This means that the two main cylinders A, A1 are retracted and that the cylinder B is also retracted (the lock is in the closed position, hidden from direct sight). The valve 11 is in its inactive position (return position).

By impressing a switch "close top" (not shown) the pump 1 will be rotated anti-clockwise, as seen in the hydraulic circuit—due to which the conduit 2 will function as a pressure conduit, whereas the two main cylinders remain inactivated; hydraulic fluid will be supplied from the pressure conduit 2 via input 14a and output 14c of the valve 14 to the push side of the cylinder B as a result of which the latter will extend to open the lock. Opening of the lock causes the switch S2 to close, due to which the valve 11 is activated and the direction of rotation of the pump 1 is changed. The conduit 3 will now function as a pressure conduit and the two inputs 13a and 13b of the AND-valve 13, as well as the output 13c of this valve will get under pressure to cause the cylinders A, A1 to extend. From the pull side of the cylinders hydraulic fluid is allowed to drain off via the pressureless output 12c and the open input 12a of the AND-valve 12. Simultaneously the pull side of the cylinder B will also get under pressure, while maintaining the pressure on the push side of this cylinder via the conduit 15 and the connections 14b and 14c of the OR-valve 14. During the closing movement of the top the lock will thus be kept open in a "regenerative" mode.

As soon as the top reaches its closed position, the switch S1 (at the fixed forward top edge) will close and cause the valve 11 to be deenergized, while the pump continues rotating clockwise. This removes the pressure at output 13c of the AND-valve and thereby of the pressure at the push side of the cylinders A, A1 and of the cylinder B. The pressure on the pull side of the cylinder B, however, is maintained and effects a direct closing movement of the lock. At the end of this closing movement a switch S3 may cause the pump motor to be switched off.

For opening the top—which is locked in its closed position—the following steps are performed:

An impression of a button "open top" causes the pump motor, as in the closing procure, to rotate anti-clockwise due to which—while the valve 11 remains inactivated yet—the cylinder B will extend and the lock will open. Opening of the lock causes the switch 2 to close, so that the valve 11 will be activated, while the pump motor keeps rotating in the same direction (anti-clockwise). This puts the two inputs 12a and 12b of the AND-valve 12 and thereby also the output 12c of this valve under pressure, so that hydraulic fluid is supplied to the pull side of the cylinders A, A1, while the push side of these cylinders will remain connected to the reservoir 4 via the pressureless inputs 13c and 13b of the AND-valve 13. The top will now be opened, while the lock is kept in the opened position.

At the end of the opening movement of the top the switch S4 closes, due to which the valve 11 will be deenergized and the direction of rotation of the pump motor will be reversed. Both sides of the cylinders A, A1 will now become pressureless, while the pressure which is maintained on the pull side of the cylinder B via conduit 3 will cause the cylinder B to retract and thereby cause the lock to return into its closed position.

In the alternative embodiment of FIG. 5 X, Y and Z designate three piston cylinder devices, which are to perform three (instead of two in the embodiment of FIG. 2) different cylinder functions. In this case two sets of piston cylinder devices X and Y are used for the opening and closing procedure, of which cylinder X constitutes the main cylinder and the cylinder Y serves for the lifting and lowering of a rear bow of the foldable top. The piston cylinder device Z serves for the up and down swinging movement of a closing cover of a space, in which the top is stored in the folded state. In this storage a type of top is involved, such as disclosed in the above mentioned Dutch patent application 9200628.

In this case the outputs U1–U8 of the circuit of FIG. 3 are used for controlling the piston cylinder devices X, Y and Z. This means that the output possibilities U9–U16 of this circuit are not used or, in other words, the four AND-valves to the right and to the left in the upper part of the circuit in FIG. 3 are omitted.

In the diagram according to FIG. 5 it can be seen, that certain outputs may together form an OR-valve.

As an example the outputs 1 and 8 in the circuit of FIG. 3 are connected, via an OR-valve 41—to the push side of the cover—cylinder Z, enabling e.g. to keep the cover lifted as long as the pump keeps rotating anti-clockwise; closing of the cover will be possible only when the pump is rotating clockwise and when valve F3 is closed.

Furthermore, with the cylinder Y for the rear bow the outputs 6 and 8 from FIG. 3 are united to an OR-valve 42 connected to the pull side of the cylinder, whereas the outputs 4 and 5 from FIG. 3 are united to an OR-valve 43 connected to the push side of the cylinder.

It will be easily understood that in this case a simple electric circuit of the valves F1, F2 and F3 and the two directions of rotation of the pump will lead to the following steps in the opening procedure of the top:

phase 1: cover up: pressure at output 1 phase 2: cover kept up and top upwardly from storage space and closing: pressure at outputs 1 and 3 phase 3: cover kept up and turning rear bow upwardly: pressure at outputs 1 and 5 phase 4: rear bow kept up and lower cover: pressure at outputs 2 and 4 phase 5: cover kept closed and lower rear bow: pressure at outputs 2 and 6

Conversely the opening of the top takes place in the following steps:

phase 1: turn rear bow upwardly, while keeping cover closed: pressure at outputs 2 and 4 phase 2: keep rear bow up and open cover: pressure at outputs 1 and 5 phase 3: keep cover open in the regenerative mode and lower rear bow: pressure at outputs 2 and 8 phase 4: keep cover open, open top and receive folded top in storage room: pressure at outputs 1 and 7 phase 5: close cover: pressure at output 2.

I claim:

1. A hydraulic circuit for controlling a plurality of hydraulic motors of a machine, said circuit comprising: a reservoir for hydraulic fluid; a reversible pump having first and second suction/pressure ports and being driven by an electric motor; a suction shuttle valve having first and second output ports each connected to a different one of said suction/pressure ports and an input port connected to said reservoir; an OR-valve having first and second input ports each connected to a different one of said suction/pressure ports and an output port connected to an inlet port of at least one electro-valve; first and second AND-valves, each having first and second input ports and an output port, with said first input ports of said first and second AND-valves each connected to a different one of said suction/pressure ports and at least one of said second input ports of said first and second AND-valves connected to an output port of said at least one electro-valve; wherein each suction/pressure port of said reversible pump and each output port of said AND-valves individually or in combination controls movement of said hydraulic motors of said machine; and wherein the outputs of at least two AND-valves are connected to an OR-valve.

2. A hydraulic circuit for controlling a plurality of hydraulic motors of a machine, said circuit comprising: a reservoir for hydraulic fluid; a reversible pump having first and second suction/pressure ports and being driven by an electric motor; a suction shuttle valve having first and second output ports each connected to a different one of said suction/pressure ports and an input port connected to said reservoir; an OR-valve having first and second input ports each connected to a different one of said suction/pressure ports and an output port connected to an inlet port of at least one electro-valve; first and second AND-valves, each having first and second input ports and an output port, with said first input ports of said first and second AND-valves each connected to a different one of said suction/pressure ports and at least one of said second input ports of said first and second AND-valves connected to an output port of said at least one electro-valve; wherein each suction/pressure port of said reversible pump and each output port of said AND-valves individually or in combination controls movement of said hydraulic motors of said machine; and wherein the outputs of said at least two AND-valves are connected with the inputs of a further AND-valve.

3. A hydraulic circuit according to claim 2, characterized in that said at least two AND-valves are connected to different electro-valves.

4. A hydraulic circuit according to claims 2 or 3, characterized in that the outputs of at least two AND-valves are connected to an OR-valve.

5. A hydraulic circuit comprising at least two double acting piston cylinder devices for opening and closing a foldable top of a vehicle of the cabriolet-type, said circuit comprising a reservoir for hydraulic liquid; a reversible hydraulic pump having first and second suction/pressure ports and being driven by an electric motor; at least two AND-valves having first and second input ports, each AND-valve having one of said input ports connected to one of said suction/pressure ports of said pump; a suction shuttle valve having first and second output ports each connected to a different one of said suction/pressure ports of said pump, and said suction shuttle valve having an input port connected to said reservoir; an OR-valve having first and second input ports each connected to a different one of said suction/pressure ports of said pump and said OR-valve having an output port connected to the fluid inlet of at least one electro-valve of the 3/2 type which is common to both of the piston cylinder devices, said electro-valve having one or more outputs which is or are hydraulically connected with said inputs of said at least two AND-valves which are not connected with said suction/pressure ports of said pump; wherein each outlet of the at least two AND-valves (12, 13) is connected to a pull side and a push side respectively of one of said piston cylinder devices; one side of the other of said piston cylinder devices is directly connected to one of the suction/pressure ports of the pump and the other side of said other piston cylinder device is connected to an output of a second OR-valve (14), said second OR-valve having inputs which are connected with the other pressure/suction port of said pump and with said outlet of said AND-valve which is connected to said one of said suction/pressure ports of said pump.

* * * * *